(12) United States Patent
Henning

(10) Patent No.: US 6,511,117 B1
(45) Date of Patent: Jan. 28, 2003

(54) AUTOMATIC TARP TENSIONING DEVICE

(75) Inventor: Steven A. Henning, Anderson, IN (US)

(73) Assignee: Aero Industries, Inc., Indianapolis, IN (US)

( * ) Notice: Subject to any disclaimer, the term of this patent is extended or adjusted under 35 U.S.C. 154(b) by 0 days.

(21) Appl. No.: 09/982,918

(22) Filed: Oct. 18, 2001

(51) Int. Cl.$^7$ ................................................. B60P 7/02
(52) U.S. Cl. ............................ 296/100.15; 296/100.12; 296/98
(58) Field of Search ..................... 296/100.15, 100.12, 296/100.18, 100.16, 105; 114/361; 135/907

(56) References Cited

U.S. PATENT DOCUMENTS

| | | | |
|---|---|---|---|
| 4,023,857 A | | 5/1977 | Killion |
| 4,126,351 A | | 11/1978 | Peteretti |
| 4,342,480 A | * | 8/1982 | Ross, Jr. ................. 296/100.12 |
| 4,505,512 A | * | 3/1985 | Schmeichel et al. .......... 296/98 |
| 4,711,484 A | | 12/1987 | Tuerk |
| 4,828,316 A | * | 5/1989 | Bennett et al. .............. 296/181 |
| 4,842,323 A | * | 6/1989 | Trickett ..................... 296/98 |
| 4,902,064 A | | 2/1990 | Tuerk et al. |
| 5,031,955 A | | 7/1991 | Searfoss |
| 5,080,422 A | * | 1/1992 | DeMonte et al. ........ 296/100.12 |
| 5,152,575 A | * | 10/1992 | DeMonte et al. ........ 296/100.12 |
| 5,271,336 A | * | 12/1993 | Willetts ..................... 296/98 |
| 5,338,084 A | | 8/1994 | Wardell |
| 5,524,953 A | * | 6/1996 | Shaer ..................... 296/100.12 |
| 5,538,313 A | | 7/1996 | Henning |
| 5,556,156 A | * | 9/1996 | Kirk ....................... 296/100.15 |
| 5,658,037 A | * | 8/1997 | Evans et al. ............. 296/100.12 |
| 5,836,332 A | | 11/1998 | Mick |
| 5,906,407 A | * | 5/1999 | Schmeichel ............. 296/100.15 |
| 5,924,759 A | * | 7/1999 | DeMonte et al. ........ 296/100.12 |
| 6,183,036 B1 | | 2/2001 | Conlson |
| 6,196,786 B1 | | 3/2001 | Shinohara |

OTHER PUBLICATIONS

"Conestogo 2000 Tarping System", Jan. 2000, Aero Industries.

* cited by examiner

*Primary Examiner*—Kiran Patel
(74) *Attorney, Agent, or Firm*—Maginot, Moore & Bowman

(57) ABSTRACT

An automatic tarp tensioning device operable to remove slack from a tarp cover due to stretching and wear includes an extension mechanism attached to a tarp cover and an adjusting element attached to the tarp cover and movable relative to the extension mechanism to apply tension to the tarp cover. A biasing mechanism is disposed between the extension mechanism and the adjusting element to bias the adjusting element away from the extension mechanism to thereby tension the tarp cover. The biasing mechanism includes a plurality of springs under compression between the extension mechanism and the adjusting element and a limiting element to limit the maximum extension of the spring. The limiting element includes a bolt and nut assembly interconnecting the extension mechanism and the adjusting member and is adjustable to control the expansion of the spring. The device operates to automatically tension the tarp cover when the cover is deployed.

11 Claims, 2 Drawing Sheets

AUTOMATIC TARP TENSIONING DEVICE

BACKGROUND OF THE INVENTION

This invention relates to an apparatus for automatically maintaining tension in extendable flexible tarp cover systems such as systems used on flatbed vehicles.

Flatbed trailers are used to haul a variety of goods ranging from large heavy articles, such as machinery, to palletized goods. It is desirable, particularly with regard to weather sensitive goods, to provide a cover to protect the load during transit. Various types of cover systems have been used, ranging from simple tarps held in place with cargo straps and tie downs, to retractable tarp systems that cover and protect the entire trailer bed from weather and debris.

One such retractable tarp system is the Conestoga® tarp cover system manufactured and sold by Aero Industries of Indianapolis, Ind. Details of this type of cover system are disclosed in the U.S. Pat. No. 4,711,484, issued on Dec. 8, 1987, U.S. Pat. No. 4,902,064, issued on Feb. 20, 1990, and U.S. Pat. No. 5,538,313, issued on Jul. 23, 1996, all of which are owned by the assignee of the present invention. The Conestoga® tarp system was developed to provide a tarp cover system that not only effectively encloses the cargo area but also protects or seals the tarp cover deployment system. The Conestoga® system includes a wheel and track deployment system that rides along the outside edges of the trailer. In this manner, the entire trailer bed is under cover.

With flexible cover systems like the Conestoga®, it is important to keep the tarp cover in tension. The tensioned tarp more effectively seals the cargo area from the elements, and resists flapping due to wind and road vibration. In the typical extendable tarp system, the tarp cover is stretched slightly on deployment and latched to a rear bulkhead element.

However, the tarp cover stretches and becomes loose over time. This leads to billowing and flapping of the cover, particularly at the end sections, which accelerates wear and deterioration of the tarp cover if not addressed. The '064 patent addresses this problem somewhat in the design of the tarp bow guide tracks. The rear portion of each guide track is inclined downwardly, so that as the rearmost bow carrier enters this part of the track, the bow which is attached to this carrier "leans" back and away from the front of the trailer, thereby pulling the tarp taught. Although this approach is automatic in that no special action by the driver of the vehicle is necessary, the amount of tightening that it provides is limited. Moreover, the degree of tightening is relatively fixed and uniform around the entire perimeter of the tarp cover.

Accordingly, a need remains for an extendable flexible cover system that can compensate for stretching of the tarp cover that occurs in use and that can maintain proper tensioning across the tarp during normal use and for the life of the tarp cover.

SUMMARY OF THE INVENTION

The present invention provides a self-tensioning tarp cover system. The invention is particularly suited for a hauling vehicle such as a flatbed truck, but can be used in other applications to define an enclosed cargo or storage area. In one embodiment of the invention, the system includes a tarp cover segment connected at one end to an extension mechanism and having an opposite end connectable to an adjusting element, which is movable relative to the extension mechanism to tighten the cover. A biasing mechanism is disposed between the extension mechanism and the adjusting element to bias the adjusting element in a direction to tighten the tarp cover.

In a preferred embodiment, the biasing mechanism includes a number of springs under compression disposed between the extension mechanism and the adjusting element along with a limiting element at each spring location that limits the extension of the spring. Most preferably, the limiting element includes a nut and bolt assembly, coaxial with the spring and adjustable for setting a maximum spring extension.

The present invention accomplishes one objective of providing a cover system that applies tension to a flexible tarp cover to prevent billowing and flapping of the cover to maximize the useful life of the cover. It is another object to provide a cover system that automatically applies tension to the tarp cover when the tarp cover system is deployed. The invention accomplishes a further object of maintaining proper tensioning across the tarp cover. Yet another object of the invention is to provide a cover system that can vary the amount of tension applied around the perimeter of a tarp cover system. These and other objects, advantages, and benefits are accomplished according to the devices of the following descriptions of the preferred embodiments of the present invention.

DESCRIPTION OF THE PREFERRED EMBODIMENTS

Figure 1:
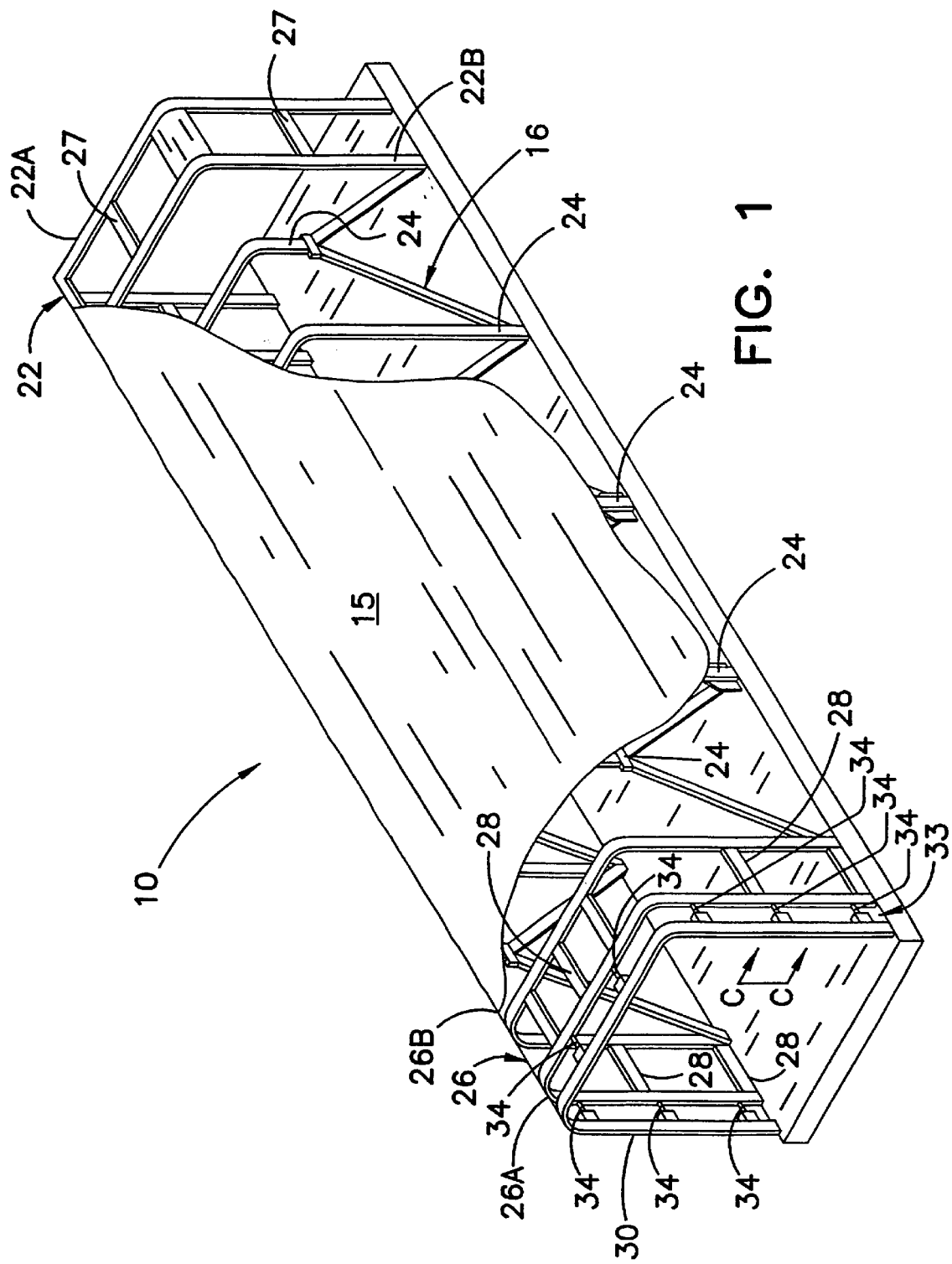
FIG. 1 is a top perspective view of a flat bed trailer with a self-tensioning tarp cover system according to one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. The inventions includes any alterations and further modifications in the illustrated devices and described methods and further applications of the principles of the invention which would normally occur to one skilled in the art to which the invention relates.

A cover system 10 featuring a self-tensioning cover system according to the present invention is shown in FIG. 1. The cover system is mounted to a base, such as a flatbed trailer 12, in a known manner. The system includes a tarp cover 15, which is partially cut away in FIG. 1 to expose the bow system or extension mechanism 16 underneath. The tarp cover 15 is sized to extend the length of the trailer 12 and to define an enclosed volume. Although not critical to the invention, the cover and extension mechanism shown is typical of a Conestoga® system, which is described in U.S. Pat. No. 5,538,313, the disclosure of which is hereby incorporated by reference. Not shown in FIG. 1 is a bulkhead that would normally be attached to the front end of the trailer forming a barrier between the trailer and the truck cab. The rear of the extended cover system can be closed with a flap, roll curtain or even a second bulkhead.

The tarp cover extension mechanism 16 includes a front section 22, an intermediate section including a plurality of bow members 24, and an end section 26. The cover in FIG. 1 is shown in its deployed position where front section 22 and rear section 26 are locked in place. Each of the sections includes one or more bow members that support the tarp cover and define the tarp enclosure. Another feature of the Conestoga® system, which is also not critical to the invention, is that the front, rear and intermediate tarp bow sections are all preferably slidable along the length of the truck bed using carriage and guide rail assemblies. However, the present invention can be used with tarp cover systems of different configurations and using different deployment mechanisms. In the deployed position in FIG. 1, the front section 22 can be attached to a front bulkhead using suitable hardware well known in the art.

Front section 22 can be an assembly including two rigidly connected bow members 22A and 22B connected by a number of cross-members generally indicated at 27. One end of tarp cover 15 can be attached to the front bow section 22 in a conventional manner around the perimeter of the cover.

Rear bow section 26 is similarly constructed; preferably including a pair of rigidly connected bows 26A and 26B attached with cross-members 28. In accordance with one aspect of the prevent invention, rear bow section 26 also includes adjusting element 30, which is connected to rear section 26, such as to bow 26A, in a manner permitting relative axial movement between the two components. The adjusting element 30 is preferably configured like a tarp bow.

According to a further aspect of the invention, the adjusting element 30 is connected to the rearmost bow 26A by way of biasing mechanism 33 that includes a plurality of biasing members generally indicated at 34. A number of biasing members 34 are distributed around the perimeter of the rear opening of the tarp cover and are most preferably uniformly distributed along the sides and top portions of the bow element 30.

In accordance with the preferred embodiment, the rear perimeter of the tarp cover 15 is connected in a conventional manner to a portion of the adjusting element 30 to move with that element. In addition, the rear bow section 26 forms part of the deployment or extension mechanism 16 of the tarp system and can be latched to the trailer 12 in a known manner. Suitable deployment and latching mechanisms are described in the aforementioned '313 patent, and the disclosure of these mechanisms in that patent is hereby incorporated herein by reference.

Figure 2:
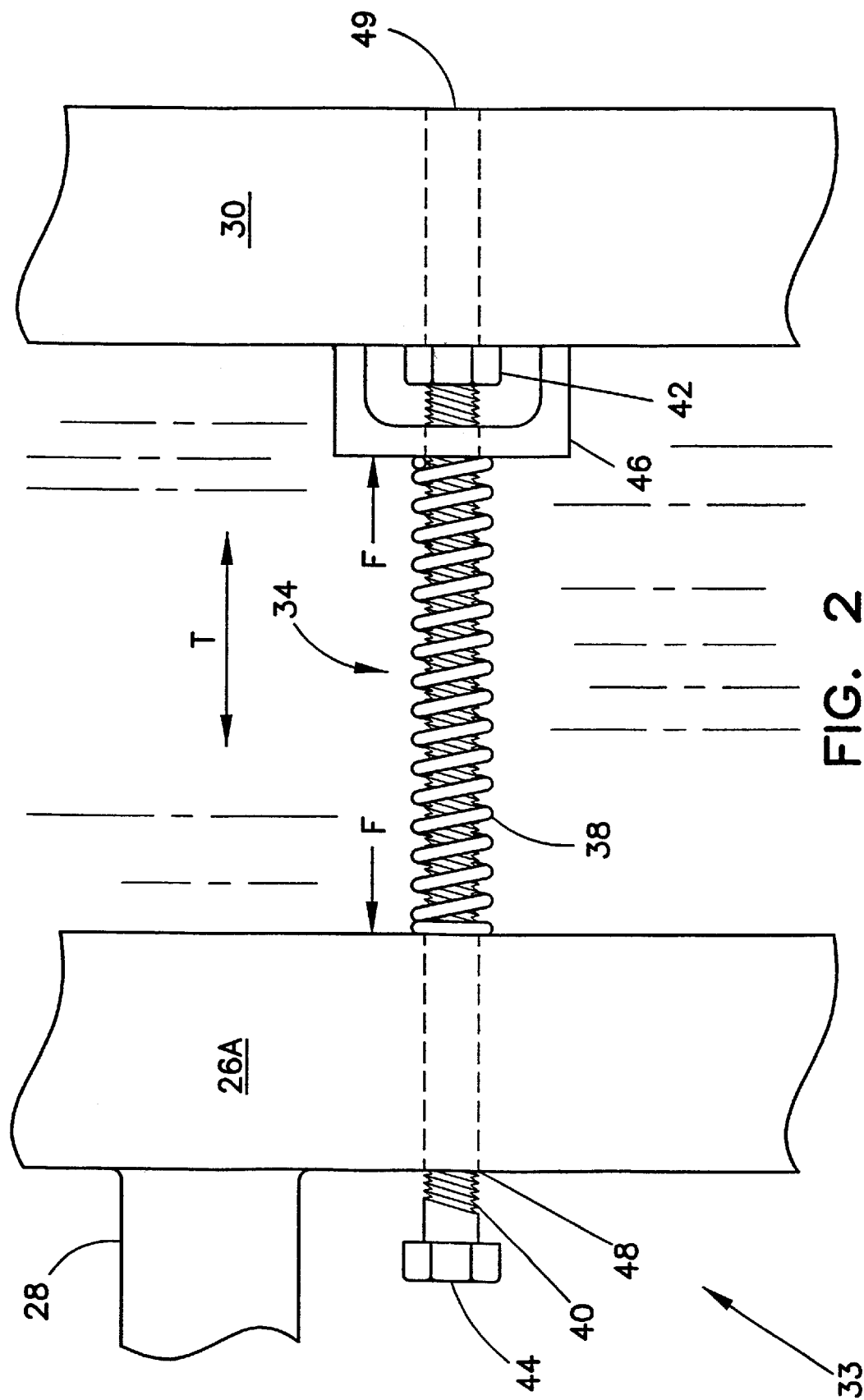
FIG. 2 is a view along sight line C—C in FIG. 1 showing the biasing mechanism according to one embodiment of the present invention.

FIG. 2 provides a detailed view of a biasing member 34 of biasing mechanism 33, along with connections to adjusting element 30 and rear section bow member 26A. In the preferred embodiment, biasing member 34 includes a spring 38 carried along a bolt 40 spanning between element 30 and bow member 26A. Bracket 46 provides a bearing surface against which the spring 38 reacts.

The bolt 40 extends through an opening 48 in the bow member 26A and is threaded into nut 42. In the preferred embodiment, the nut 42 is attached to adjusting element 30, such as by welding the nut at the opening 48. An opening 49 is provided in the adjusting element 30 into which the end of bolt 40 may extend. In an alternative embodiment, the opening 49 can be threaded to receive the threaded bolt, thereby eliminating the nut 42. Bolt head 44 acts as an expansion limiting element that is configured to limit the movement of adjusting element 30 from the rear bow member 26A. Specifically, as the tarp 15 stretches, the spring 38 pushes against the adjusting element 30 to pull the tarp taut. In the embodiment illustrated in FIG. 2, the amount of expansion of the spring is limited by the distance between the limiting element or bolt head 44 and the rear tarp bow section 26A. Bolt 40 can be advanced into or backed out of nut 42, thus providing a variable limit to the amount that the tarp 15 can stretch.

Once attached to the rear tarp bow section 26A, the adjusting element 30 moves with the rear bow section 26 as the tarp system is moved between its deployed position and collapsed position for loading. As the end sections are moved to and locked into their deployed positions, the natural tension in the tarp cover will tend to pull the adjusting element 30 toward the tarp bow, thereby compressing the spring 38. In a specific embodiment, the amount of compression of the spring is limited by the compressed height of the spring itself. Ideally, the spring (and its spring force) can be calibrated relative to the locked position of the rear tarp bow member 26A so that the tarp cover is appropriately tensioned without bottoming the spring.

With the tarp cover in its extended position, and with the rear bow section locked in place, the tarp cover is in tension around its entire perimeter. The adjusting element 30, through the biasing members 34, applies a force F to tarp bow section 26A and adjusting element 30, which automatically applies tension T to the tarp cover 15 to take up any slack in the tarp cover. As portions of the tarp cover stretch, either temporarily in response to vibration or semi-permanently, the biasing member nearest each portion responds by extension of the spring. Even as the spring extends, it still exerts a force F to maintain the tension in the tarp cover. It should be understood that this process occurs automatically and is essentially governed by the spring constant of the springs 38 situated around the perimeter of the tarp cover.

While the invention has been illustrated and described in detail in the drawings and foregoing description, the same is to be considered as illustrative and not restrictive in character. It should be understood that only the preferred embodiments have been shown and described and that all changes and modifications that come within the spirit of the invention are desired to be protected.

For instance, the illustrated embodiment contemplates a linear coil spring that is carried by a bolt spanning the adjusting element and the rear bow member. The spring may be non-linear in that it applies a tensioning force F that is a non-linear function of its degree of extension or compression. In a further alternative, the bolt itself can be eliminated, provided the spring can be retained in is operative position and the rearward movement of the adjusting element can be limited. For instance, the ends of the spring itself can be fixed to the bow member 26A and adjusting element 30. A stop can be provided on the trailer bed 12 to limit rearward movement of the adjusting element.

As a further alternative, the coil spring can be replaced with other forms of biasing members. Suitable alternatives can include leaf springs and plate springs, as well as compressible members like rubber bushings.

What is claimed is:

1. A self-tensioning tarp cover system for extension over a base, said tarp cover system comprising:
   an extension mechanism associated with said tarp cover and operable to extend said tarp cover over the base;
   an adjusting element carried by said extension mechanism to move therewith and including a portion configured for attachment to the tarp cover; and
   a biasing mechanism disposed between said extension mechanism and said adjusting element and operable to bias said adjusting element away from said extension mechanism, thereby applying tension to the tarp cover when connected to said adjusting element.

2. The tarp cover system of claim 1, wherein said biasing mechanism includes a spring disposed between said adjusting element and said extension mechanism, said spring being normally under compression when said extension mechanism has extended the tarp cover over the base.

3. The tarp cover system of claim 1, in which the tarp cover system includes a plurality of extendable bow members for supporting the tarp cover to define a perimeter, wherein said biasing mechanism includes a plurality of biasing members distributed around the perimeter of the tarp cover.

4. The tarp cover system of claim 3, wherein said extension mechanism and said adjusting element each include a bow-shaped portion corresponding to the extendable bows supporting the tarp cover.

5. The tarp cover system of claim 3, wherein said plurality of biasing members includes a plurality of springs disposed between said adjusting element and said extension mechanism, said springs being normally under compression when said extension mechanism has extended the tarp cover over the base.

6. The tarp cover system of claim 1, wherein said biasing element includes at least one limiting element configured to limit the movement of said adjusting element away from said extension mechanism.

7. The tarp cover system of claim 6, wherein said limiting element is adjustable.

8. The tarp cover system of claim 7, wherein:

said limiting element includes a bolt extending between said adjusting element and said extension mechanism; and said biasing mechanism includes a spring carried by said bolt and disposed between said adjusting element and said extension mechanism.

9. The tarp cover system of claim 8, wherein at least one of said adjusting element and said extension mechanism defines a first hole therethrough for slidably receiving said bolt therethrough.

10. The tarp cover system of claim 9, wherein the other of said adjusting element and said extension mechanism includes threads for adjustably threadedly engaging said bolt.

11. The tarp cover system of claim 10, wherein said other of said adjusting element and said extension mechanism includes:

a second hole defined therein and aligned with said first hole, said threads being associated with said second hole; and a bracket attached thereto, said bracket defining a hole therethrough, aligned with said first hole, for slidably receiving said bolt therethrough, and said bracket being arranged to contact said spring.

\* \* \* \* \*